United States Patent [19]

Zeinstra et al.

[11] Patent Number: 5,479,155
[45] Date of Patent: *Dec. 26, 1995

[54] VEHICLE ACCESSORY TRAINABLE TRANSMITTER

[75] Inventors: Mark L. Zeinstra; Kurt A. Dykema, both of Holland, Mich.

[73] Assignee: Prince Corporation, Holland, Mich.

[*] Notice: The term of this patent shall not extend beyond the expiration date of Pat. No. 5,442,340.

[21] Appl. No.: 263,263

[22] Filed: Jun. 21, 1994

Related U.S. Application Data

[63] Continuation of Ser. No. 874,361, Apr. 24, 1992, abandoned, which is a continuation-in-part of Ser. No. 567,390, Aug. 14, 1990, which is a continuation-in-part of Ser. No. 279,643, Dec. 5, 1988, abandoned.

[51] Int. Cl.⁶ ................................................ G05B 19/02
[52] U.S. Cl. .................. 340/825.22; 340/825.69; 340/825.72
[58] Field of Search .................... 340/825.22, 825.71, 340/825.69, 825.72, 825.31; 359/148; 341/176; 455/161.1, 161.2, 71

[56] References Cited

U.S. PATENT DOCUMENTS

| Re. 29,525 | 1/1978 | Willmott | 340/825.69 |
|---|---|---|---|
| 3,337,992 | 12/1965 | Tolson . | |
| 4,178,549 | 12/1979 | Lendenbach et al. | 375/22 |
| 4,197,503 | 4/1980 | Dini . | |
| 4,201,944 | 5/1980 | Beunders . | |
| 4,241,870 | 12/1980 | Marcus | 296/37.7 |
| 4,247,850 | 1/1981 | Marcus | 341/176 |
| 4,360,801 | 11/1982 | Duhame . | |
| 4,385,296 | 5/1983 | Tsubaki et al. | 340/825.69 |
| 4,447,808 | 5/1984 | Marcus | 341/176 |
| 4,482,947 | 11/1984 | Zato et al. | 364/138 |
| 4,509,093 | 4/1985 | Stellberger | 361/172 |
| 4,529,980 | 7/1985 | Liotine et al. | 340/825.52 |
| 4,535,333 | 8/1985 | Twardowski | 340/825.69 |
| 4,550,311 | 10/1985 | Galloway et al. | 340/531 |
| 4,573,046 | 1/1986 | Pinnow | 340/825.56 |
| 4,595,228 | 6/1986 | Chu | 296/37.7 |
| 4,596,985 | 6/1986 | Bongard et al. | 340/825.69 |
| 4,623,887 | 11/1986 | Welles, II | 340/825.57 |
| 4,626,848 | 12/1986 | Ehlers | 340/825.69 |
| 4,631,708 | 12/1986 | Wood et al. . | |
| 4,635,033 | 1/1987 | Inukai et al. . | |
| 4,652,860 | 3/1987 | Weishaupt et al. | 340/539 |
| 4,665,397 | 5/1987 | Pinnow | 340/825.56 |
| 4,670,746 | 6/1987 | Taniguchi et al. . | |
| 4,703,359 | 10/1987 | Rumbolt et al. | 358/194.1 |
| 4,750,118 | 6/1988 | Heitschel et al. | 364/400 |
| 4,754,255 | 6/1988 | Sanders et al. . | |
| 4,771,283 | 9/1988 | Imoto | 340/825.71 |
| 4,825,200 | 4/1989 | Evans et al. . | |
| 4,866,434 | 9/1989 | Keenan | 430/825.72 |
| 4,872,205 | 10/1989 | Smith . | |
| 4,878,052 | 10/1989 | Schulze | 340/825.69 |
| 4,881,148 | 11/1989 | Lambropoulos et al. | 361/172 |
| 4,890,108 | 12/1989 | Drori et al. . | |
| 4,912,463 | 3/1990 | Li | 340/825.69 |
| 4,929,877 | 5/1990 | Clark et al. . | |

(List continued on next page.)

*Primary Examiner*—Donald J. Yusko
*Assistant Examiner*—Edwin C. Holloway, III
*Attorney, Agent, or Firm*—Price, Heneveld, Cooper, DeWitt & Litton

[57] ABSTRACT

A vehicle accessory includes a trainable transmitter for duplicating the signal of an existing remote control. In one embodiment, the system includes a variable frequency generator having a frequency control input and an output. In one embodiment, also, the transmitter includes a switch for selectively disabling the variable frequency generator. According to another embodiment, the transmitter is trained by adjusting the frequency of the signal output by the variable frequency generator until it matches a signal transmitted by an existing remote control for a garage door opening mechanism. According to another embodiment, a variable attenuator is controlled to adjust the magnitude of the output signal of the variable frequency generator in inverse relationship to the duty cycle of output signals therefrom.

18 Claims, 8 Drawing Sheets

U.S. PATENT DOCUMENTS

| | | |
|---|---|---|
| 4,953,305 | 9/1990 | Van Lente et al. . |
| 4,978,944 | 12/1990 | Andros et al. . |
| 4,988,992 | 1/1991 | Heitschel et al. .................. 340/825.69 |
| 5,028,919 | 7/1991 | Hidaka . |
| 5,123,008 | 6/1992 | Beesley . |
| 5,126,686 | 6/1992 | Tam . |
| 5,182,551 | 1/1993 | Goto . |
| 5,235,327 | 8/1993 | Igarashi et al. . |
| 5,262,769 | 11/1993 | Holmes . |
| 5,266,945 | 11/1993 | Peek et al. . |

VEHICLE ACCESSORY TRAINABLE TRANSMITTER

CROSS REFERENCE TO RELATED APPLICATIONS

This application is a continuation of U.S. patent application Ser. No. 07/874,361, filed on Apr. 24, 1992, now abandoned, which is a continuation-in-part of pending U.S. patent application Ser. No. 07/567,390, filed on Aug. 14, 1990, which is a continuation-in-part of U.S. patent application Ser. No. 07/279,643, filed on Dec. 5, 1988, now abandoned.

BACKGROUND OF THE INVENTION

The present invention pertains to a vehicle accessory and particularly to an accessory which includes a trainable transmitter for remotely controlling devices such as a garage door opening mechanism.

Electrically operated garage door openers are a popular vehicle and home accessory. Their operation typically requires the use of a remote transmitter which is battery powered and carried in the homeowner's vehicle for transmitting radio frequency signals which are received by a garage door opener receiver for controlling the garage door opening mechanism attached to the garage door. In the prior art, the garage door transmitters have consisted of an enclosure with a battery which must be periodically replaced. The unit is portable and vehicle owners typically either clip them to the vehicle visor or in some cases they are removably mounted to the dashboard.

There exists several inconveniences with such prior art units, the first being that with the portable unit it is typically necessary to physically reach for and move the unit from a storage location into an optimum position for operation of the garage door. This optimum position is usually in the windshield area. Thus, if the portable unit is mounted on the dash board, it must be removed and directed toward the garage door for operation. If it is mounted on the visor, it can become a safety hazard in the form of a relatively hard projection at the head level in the vehicle. Further, it obstructs motion of the visor, which when moved, sometimes knocks the transmitter from the visor. Thus, such an arrangement interferes with visor use and posses a safety threat.

Further, there has been a recent increase in the theft of portable garage door opening transmitters, even, for example, at car wash facilities where the car is unattended by the owner. The thief has access to the interiors of the vehicle and can copy the home address from the registration and remove the garage door opening transmitter which will not be missed until a later time. This provides access to the owners garage which may be locked and frequently the home which is thought to be secure by the locking of the garage. Thus, the common portable garage door opening transmitter which typically is provided with the garage door opener suffers from many problems including as well that they frequently are unsightly and do not match the vehicles interior decor.

One successful method of solving some of the problems and providing a convenient location for the remote control in the vehicle involves mounting the existing remote control in a vehicle storage compartment such as taught by U.S. Pat. No. 4,595,228. This however does not prevent the theft problem. U.S. Pat. No. 4,447,808 entitled REARVIEW MIRROR TRANSMITTER ASSEMBLY issued to Marcus on May 8, 1984, teaches the mounting of a garage door opening transmitter in a rearview mirror assembly. U.S. Pat. No. 4,241,870 entitled REMOTE TRANSMITTER IN HOUSING issued to Marcus on Dec. 30, 1980, teaches the mounting of such a transmitter in a console on a vehicle headliner. U.S. Pat. No. 4,427,850 entitled VISOR AND GARAGE DOOR OPERATOR ASSEMBLY issued to Marcus on Jan. 27, 1981, teaches the mounting of a garage door opening transmitter in a visor. Although the systems described in the latter three patents disclose convenient locations for integrally mounting a remote control transmitter in a vehicle, both require a new homeowner receiver or electrical modification of the receiver to interface with the vehicle installed transmitter such that the same frequency and coding is employed.

SUMMARY OF THE INVENTION

The system of the present invention represents an improvement over the prior art by providing a trainable transmitter for integrally mounting in a vehicle and one which therefore does not require modification of the homeowners receiver or the vehicle after the vehicle is purchased. According to one aspect of the invention, a vehicle accessory is provided for mounting to the interior of a vehicle in an area available to the vehicle operator and includes a transceiver for receiving signals from an existing garage door opening transmitter. The transceiver includes means for detecting the frequency and coding of signals from an existing garage door opening transmitter and for providing a modulating output signal representative thereof. The transceiver also includes a transmitter coupled to said detecting means and responsive to said modulating signal therefrom for outputting a control signal which duplicates the signal of the existing remote control transmitter. In a preferred embodiment the transceiver includes a variable frequency generator for generating an output signal having a selected frequency. An output circuit is connected to the output of the variable frequency generator to transmit the signal output from the variable frequency generator to activate the receiver and actuate the garage door opening mechanism. The system further includes an input circuit which detects a transmitted signal from an existing remote control transmitter and outputs the detected signal to a control circuit which generates a frequency control signal which controls the variable frequency generator. According to another aspect of the invention, the frequency of the signal generated by the variable frequency generator is adjusted until data is detected at the input of the control circuit.

According to yet another aspect of the invention, the variable frequency generator includes a switch having a switch control input and the control circuit generates a switch control signal including a pulse sequence which selectively disables a voltage controlled oscillator.

One aspect of the invention includes a variable impedance means having a signal input coupled to the output of the variable frequency generator for controlling the magnitude of the signal transmitted by the output device.

A variable frequency generator, according to another aspect of the invention, includes a fixed reference signal generator, a variable frequency reference signal generator, a summer connected to the variable frequency signal generator and the fixed frequency signal generator for combining an output of the variable frequency generator and an output of the fixed frequency generator, a sample-and-hold circuit coupled to an output of said summer, and a voltage controlled oscillator connected to an output of the sample-and-hold circuit, with the voltage controlled oscillator outputting said variable frequency generator output signal.

A trainable transmitter is thus disclosed which includes circuit means to allow it to be trained to transmit a variety of different control signals compatible with different types of existing garage door opening mechanisms. The transmitter learns one of the garage door opener remote control signals from an existing transmitter and thus its installation as original equipment in a vehicle does not require modification of the vehicle owners garage door opening receiver. Remote signals from a remote control transmitter are reliably learned and retransmitted with the system of the present invention to control existing garage door opening mechanism.

These and other features, objects and advantages of the present invention can best be understood by referring to the following description of the invention together with reference to the accompanying drawings in which:

DETAILED DESCRIPTION OF THE PREFERRED EMBODIMENTS

Figure 1:
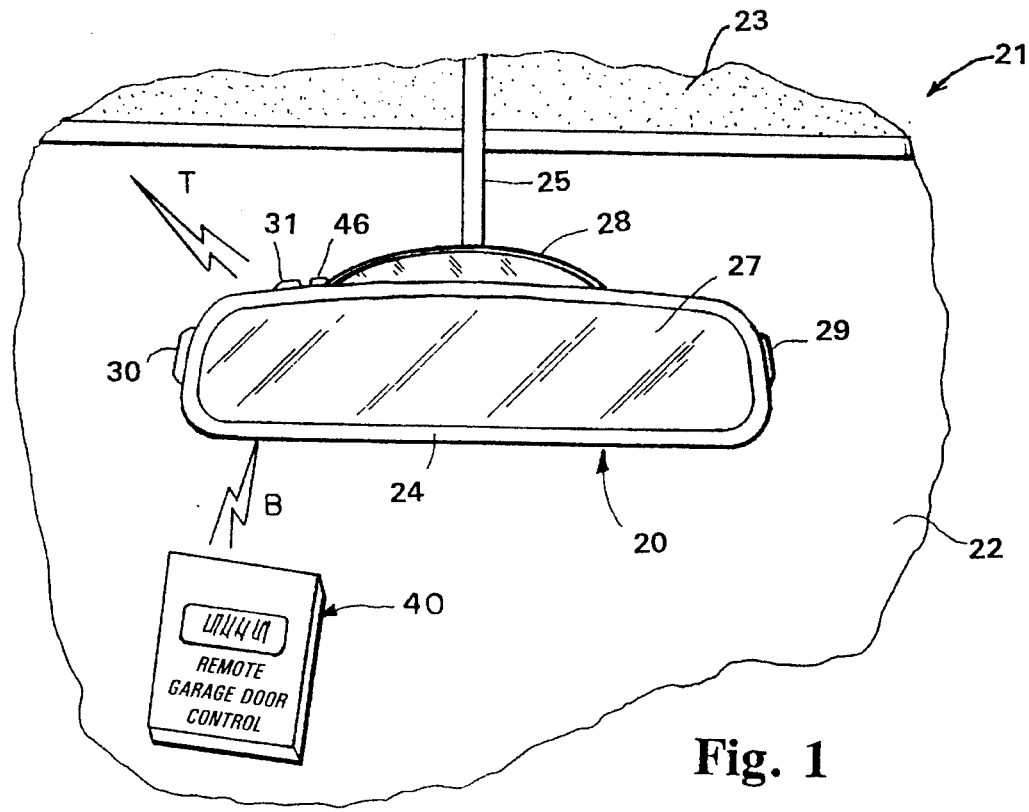
FIG. 1 is a fragmentary front elevational view of a vehicle and vehicle accessory including a trainable transmitter according to the present invention.
Figure 4:
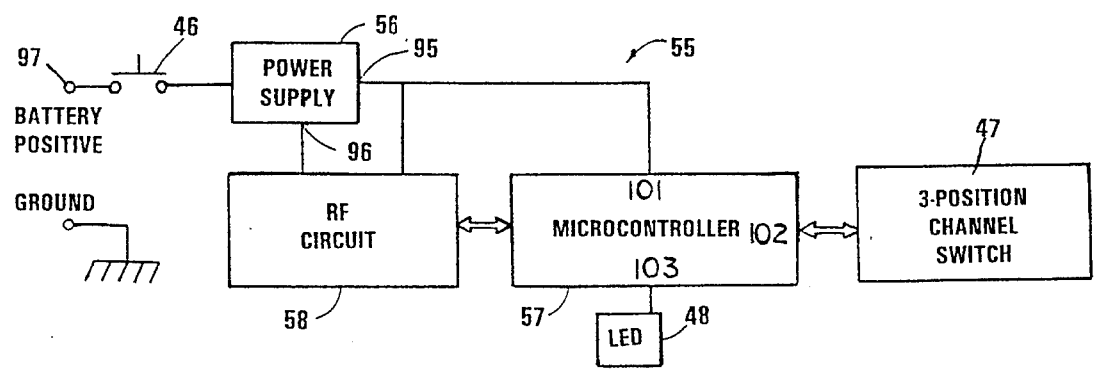
FIG. 4 is an electrical circuit diagram partly in block and schematic form of a transceiver embodying the present invention.
Figure 5:
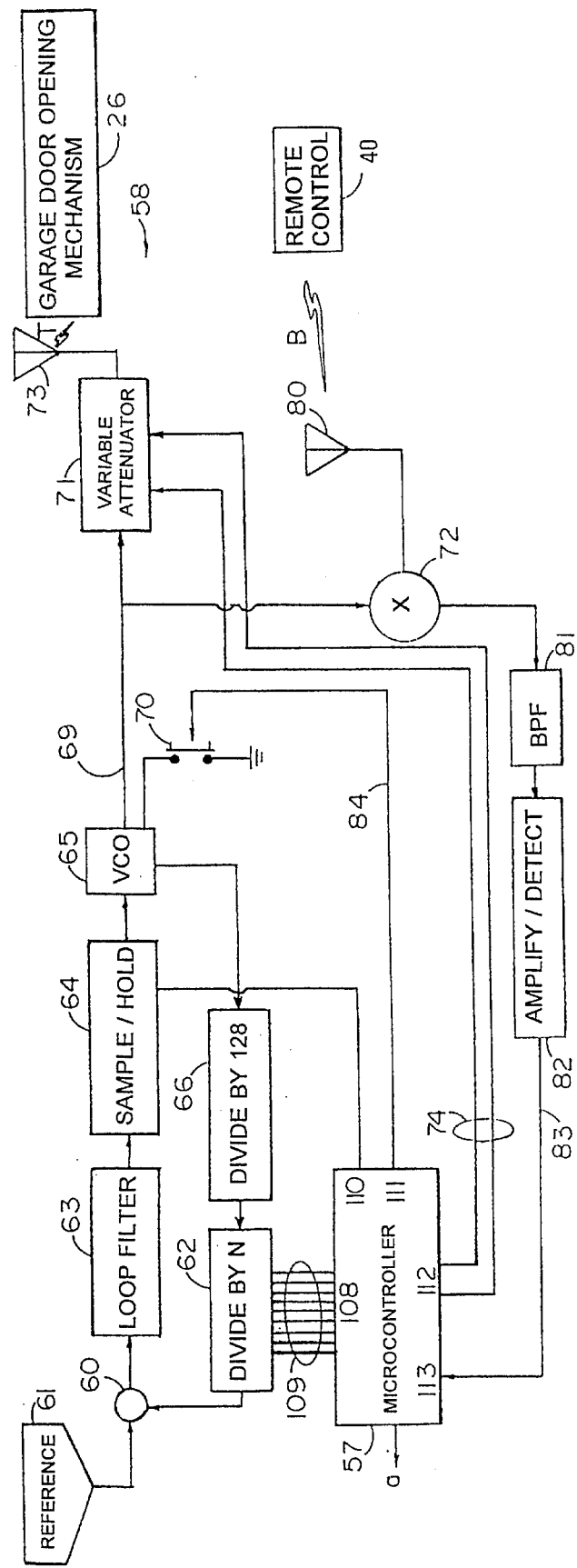
FIG. 5 is an electrical circuit diagram partly in block and schematic form of a transceiver embodying the present invention.

Referring initially to FIG. 1, in this embodiment, the invention is integrated into a mirror assembly 20 which includes a transceiver 55 (FIG. 4) which selectively transmits coded radio frequency (RF) energy as indicated by arrow "T" to a garage door opening mechanism 26 shown in block form in FIG. 5. The conventional garage door opening mechanism 26 includes a receiver and control circuit which are responsive to the control signal "T" for opening and closing a garage door. The transceiver 55 includes a programmable micro-controller 57 which controls a radio frequency (RF) circuit 58 to generate signal "T" which is of a frequency and code learned from signal "B" transmitted by an existing remote control transmitter 40 while transceiver 55 is in a training mode as described in greater detail below. The transceiver can than transmit the stored signal as remote control signal "T" to activate garage door opening control mechanism 26 (FIG. 5) without further need for the remote transmitter 40. Transmitter 40 is typically provided with the garage door opening mechanism 26 and generates control signal "B" for remotely actuating the garage door opening mechanism but suffers from the storage and use problems discussed above.

Mirror assembly 20 is described in commonly assigned co-pending U.S. patent application Ser. No. 07/685,880 entitled MODULAR MIRROR WITH ELECTRICAL ACCESSORIES filed on Apr. 15, 1991, the disclosure of which is incorporated herein by reference. In general, the mirror construction includes a housing 24 constructed from a rear housing 38 (FIG. 2) and a front mirror frame or bezel 37. Mirror housing 24 is attached to windshield 22 of vehicle 21 or to the edge of the headliner 22 in a conventional manner by a structure including a ball mount 39 while a sheath 25 may be provided to conceal electrical conductors extending from the mirror housing 24 to the remainder of the electrical circuits in the vehicle.

Figure 2:
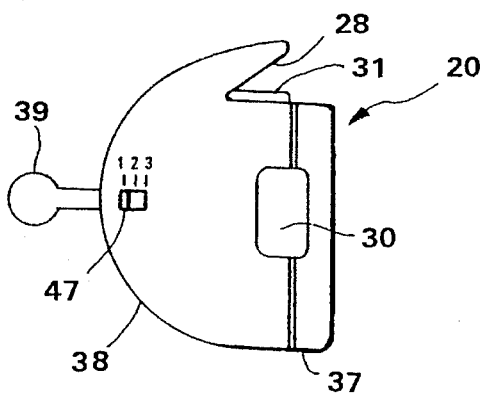
FIG. 2 is a left side elevational view of the accessory shown in FIG. 1.

The mirror assembly includes an electrically adjustable mirror 27 provided by any suitable mirror adjustment means such as an electrochromic mirror or a electro-mechanically adjustable mirror which adjusts the reflectivity of mirror 27 according to the driver's need. The mirror assembly also includes a temperature and compass display 28 and five switches 29–31, 46 and 47. Switches 29 and 30 actuate right and left map lamps (not shown) located in the bottom wall of the mirror front bezel 37 and rear housing 38 (FIG. 2). Switch 31 is an electrically adjustable mirror (EAM) train switch which controls an internal control circuit to train the mirror according to current light conditions as described in the above identified co-pending patent application Ser. No. 7/685,880. Switch 46 is a garage door opener (GDO) train/activate switch which selectively controls a micro-controller 57 and a transceiver 58 either to transmit RF signal energy "T", which actuates the garage door opening mechanism 26, or to receive and store the control signal "B" from remote control 40, as described below with respect to FIGS. 6a–9. By receiving and storing control signal "B" from remote control 40, the circuit controller is trained to later transmit signal energy "T" which will be effective to actuate mechanism 26. Switch 47 is a three position switch which is used to select one of three different signals stored in micro-controller 57 for actuating up to three different door opening mechanisms for multiple car garages.

Figure 3:
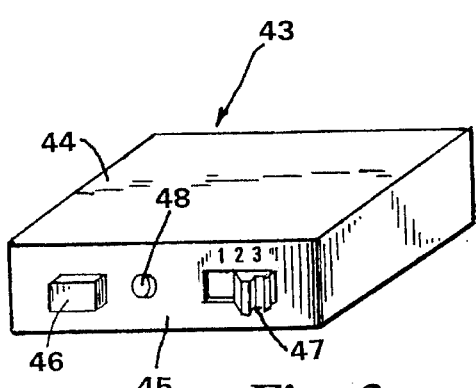
FIG. 3 is a perspective view of an alternate housing for the trainable transmitter according to the present invention.

Control circuit 55 may alternately be provided in a generally square module housing 43 including a front panel 45 as seen in FIG. 3. A GDO activate/train switch 46 is provided on panel 45 as is an LED indicator 48 to provide visual signals to a user during training of the transmitter. Three-position switch 47 is utilized to select one of three different stored codes and is also positioned on panel 45. The module housing 43 is small such that it may be installed at a variety of suitable locations in the vehicle, such as in an overhead console, a map light, the instrument panel, or any other suitable position within the vehicle. In one embodiment, module 43 is approximately 2"×2" and has a height of less than one inch.

Having briefly described the overall preferred mounting environment of this system and its relationship to a vehicle, a detailed description of the preferred embodiment of the invention is now presented in connection first with the circuit diagrams of FIGS. 4 and 5 and subsequently with reference to a program flow diagram of FIGS. 6a–9.

Referring to FIG. 4, RF transceiver circuit 55 is mounted within mirror housing 24 (FIGS. 1 and 2) or module housing 43 (FIG. 3) and includes a power supply 56 for converting operating power from the vehicles battery supply to the necessary voltage levels for activation of the electrical circuits to which supply 56 is coupled in a conventional manner. Circuit 55 includes a micro-controller 57 coupled to an RF circuit 58 and to a three position channel select switch 47. Circuit 55 also includes an indicator LED 48, and a transmit switch 46 coupling power supply 56 to the vehicle's battery positive supply, and a connection to battery ground. As seen in FIG. 5, RF circuit 58 includes a summing circuit 60 which sums a signal output from reference signal generator 61 and a signal output from a divide-by-N divider 62. Reference generator 61 generates a fixed frequency signal and may include a commercially available crystal oscillator with an output frequency of approximately 8 MHz and a divider which reduces the reference frequency signal to 7.8125 KHz. The controllable divider 61 is provided by any suitable commercially available divider, such as integrated circuit model numbers 145151 or 145106. The output signal from summing circuit is coupled to the input of a loop filter 63, which is preferably an active integrator including an operational amplifier and a capacitor. The output of the integrator is a DC signal which is applied to the input of a sample-and-hold circuit 64. Sample-and-hold circuit 64 is of any suitable construction such as a switch and capacitor (not shown) with the switch being controlled by a control signal from the output 110 of micro-controller 57. The output of sample-and-hold circuit 64 is applied as a control input signal to a voltage controlled oscillator (VCO) 65.

The output frequency of VCO 65 will increase or decrease according to the magnitude of the control input voltage from sample-and-hold circuit 64. The voltage controlled oscillator may be any suitable voltage controlled oscillator which is tunable to frequencies between 200 and 400 MHz with an input tuning control voltage of 0 to 7 volts, and adapted to operate in the automobile environment. In a preferred embodiment of the invention, VCO 65 is of the type including two varactor diodes, two transistors, capacitors, resistors and an inductor coupled to provide the desired frequency output for a given input voltage. RF circuit 58 also includes a switch 70 connected in parallel with the inductor in VCO 65 such that the VCO generates an oscillating output signal when switch 70 is open. When switch 70 is closed, the inductor is shorted, and the VCO outputs a DC signal. Switch 70 may be any suitable switch, such as a bipolar transistor, an FET, a relay switch, or the like. Sample-and-hold circuit 64 holds the control input voltage to VCO 65 at a set level when the VCO stops generating an oscillating output signal such that the VCO will output a signal having the desired frequency when the VCO is switched from off to on.

The output of VCO 65 is inputted to a divide-by-128 divider 66, a variable attenuator 71, and a mixer 72. Variable attenuator 71 conventionally includes series circuits each of which has a resistor and a switch connected between a node of divider network and ground for controlling the magnitude of the output signal of VCO 65 such that the signal output from VCO 65 has an amplitude inversely related to the duty cycle of control pulses applied to switch 70. Accordingly, signals having a longer on time have a smaller amplitude than signals having a short on time to comply with Federal Communication Regulations. Each of the resistors of attenuator selectively shunts the output of VCO 65 under the control of its associated solid state switch. The switches are controlled by attenuator select signals at output 112 of micro-controller 57. In one implementation of the invention, variable attenuator 71 includes two impedance devices connected in parallel between antenna 73 and ground. Each impedance device includes a resistor connected in series with a switch which may be any suitable device such as bipolar transistors, an FET switch, or the like. In operation, one, two, or neither of the resistors is connected to shunt the output of VCO 65 depending upon duty cycle of the control signal input to switch 70.

Mixer 72 combines the signal output from VCO 65 with signal "B" from remote control 40, which is received by antenna 80. The output signal from mixer 72 is applied to filter 81 and will have a frequency of 3 MHz when the output of VCO 65 is 3 MHz greater than the frequency of the signal from remote control 40. A conventional bandpass filter 81 has a center frequency of 3 MHz to pass the detected signal output of mixer 72 which is applied to the input of amplifier/detector 82. Amplifier/detector 82 includes a half-wave rectifier, provided by a series diode (not shown), and an amplifier. The output of amplifier detector 82 is a digital signal applied to input 113 of micro-controller 57.

Micro-controller 57 controls the operation of circuit 55, and may be provided by any suitable commercially available integrated circuit, such as IC model number HC05P1 available from Motorola. The micro-controller preferably includes a non-volatile memory in which the micro-controller program is stored. The power supply 56 (FIG. 4) provides a regulated 5 volt DC reference potential at terminal 95 and a regulated 12 volt DC reference potential at terminal 96. Circuits for providing the regulated voltages are well known and accordingly will not be described in further detail herein. Power supply 56 receives power from the vehicle battery through switch 46 and battery positive conductor 97. Accordingly, when switch 46 is closed, power is supplied to RF circuit 58 and microprocessor 57. The micro-controller 57 includes a power supply input 101 connected to the 5 volt power supply output 95 to receive power therefrom. Terminals 102 of micro-controller 57 are connected to three position channel switch 47 to provide the micro-controller with an indication of the position of channel switch 47. Output terminal 103 is connected to LED 48 to energize the LED as described in greater detail hereinafter.

The RF circuit 58 connected to micro-controller 57 includes all of the circuit elements shown in FIG. 5 except for micro-controller 57, garage door opener mechanism 26, and the existing remote control 40. Outputs 108 of micro-controller 57 are connected to divide-by-N divider 62 through multi-conductor bus 104. Bus 104 is connected to the control input of divide-by-N counter 62 to select the frequency of the signal output by divide-by-N counter 62. Output 110 of micro-controller 57 is connected to control the sample-and-hold circuit 64 to hold a signal level when switch 70 is closed such that VCO 65 does not output oscillating signals. Output 111 of micro-controller 57 is connected to the control input of switch 70. Outputs 112 of micro-controller 57 are connected to variable attenuator 71 to select the degree of attenuation to be provided to the signal output from VCO 65. Signals received by antenna 80 are connected to data input 113 of micro-controller 57 through amplifier/detect circuit 82, bandpass filter 81, and mixer 72. The circuit represented by FIGS. 4 and 5 is a self contained trainable transmitter for the environment illustrated in FIG. 3. It will be recognized that the micro-controller 57 will include additional inputs and outputs for the environment illustrated in FIGS. 1 and 2, as disclosed in the above identified application Ser. No. 07/685,880. The main program for the micro-controller 57 of trainable transmitter 55 is shown in FIGS. 6a–6c and is now described.

Figure 6A:
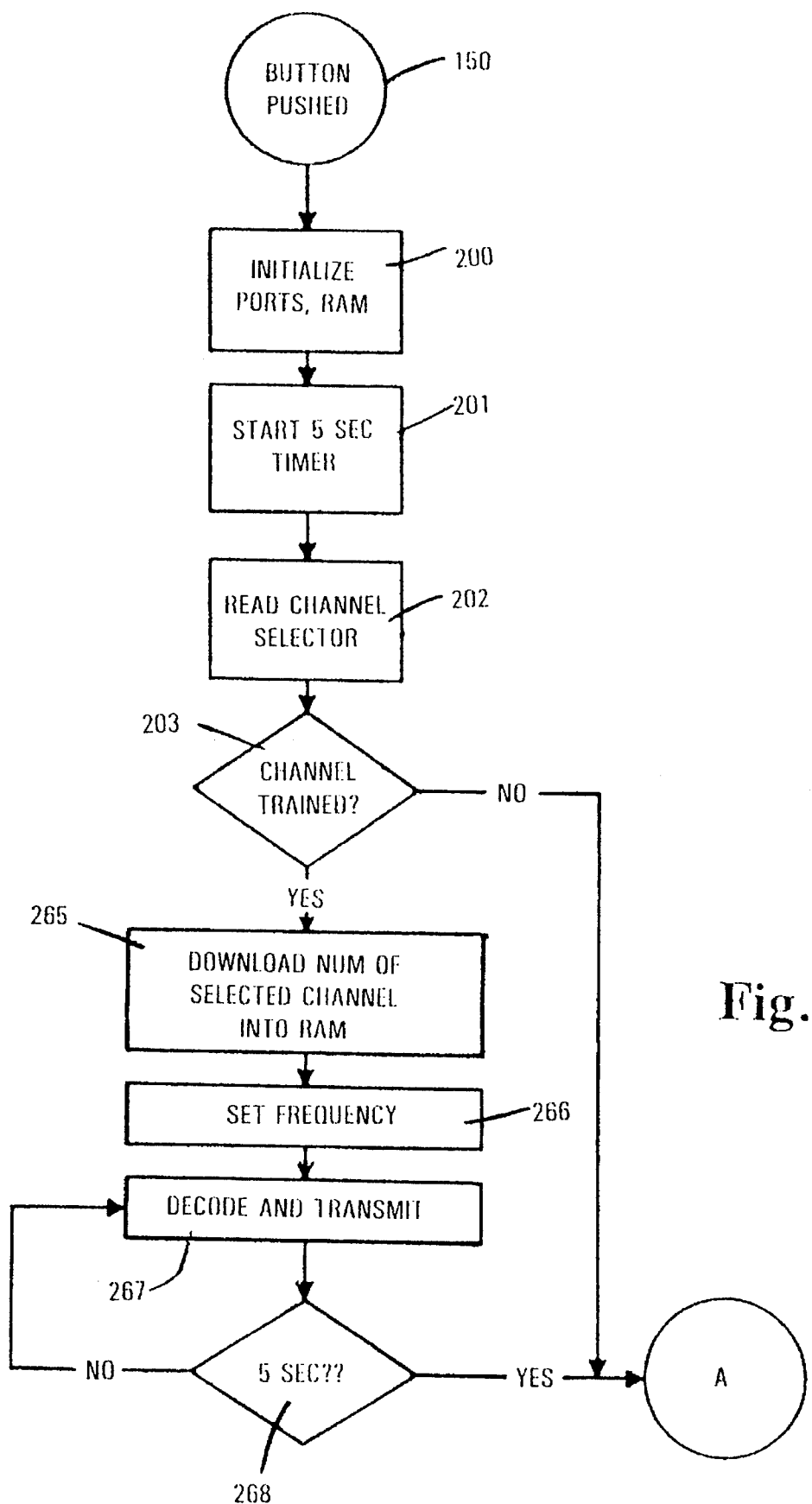
FIGS. 6a, 6b and 6c constitute a flow diagram of the main program employed in the micro-controller of the programmable control circuit shown in FIGS. 4 and 5.
Figure 6B:
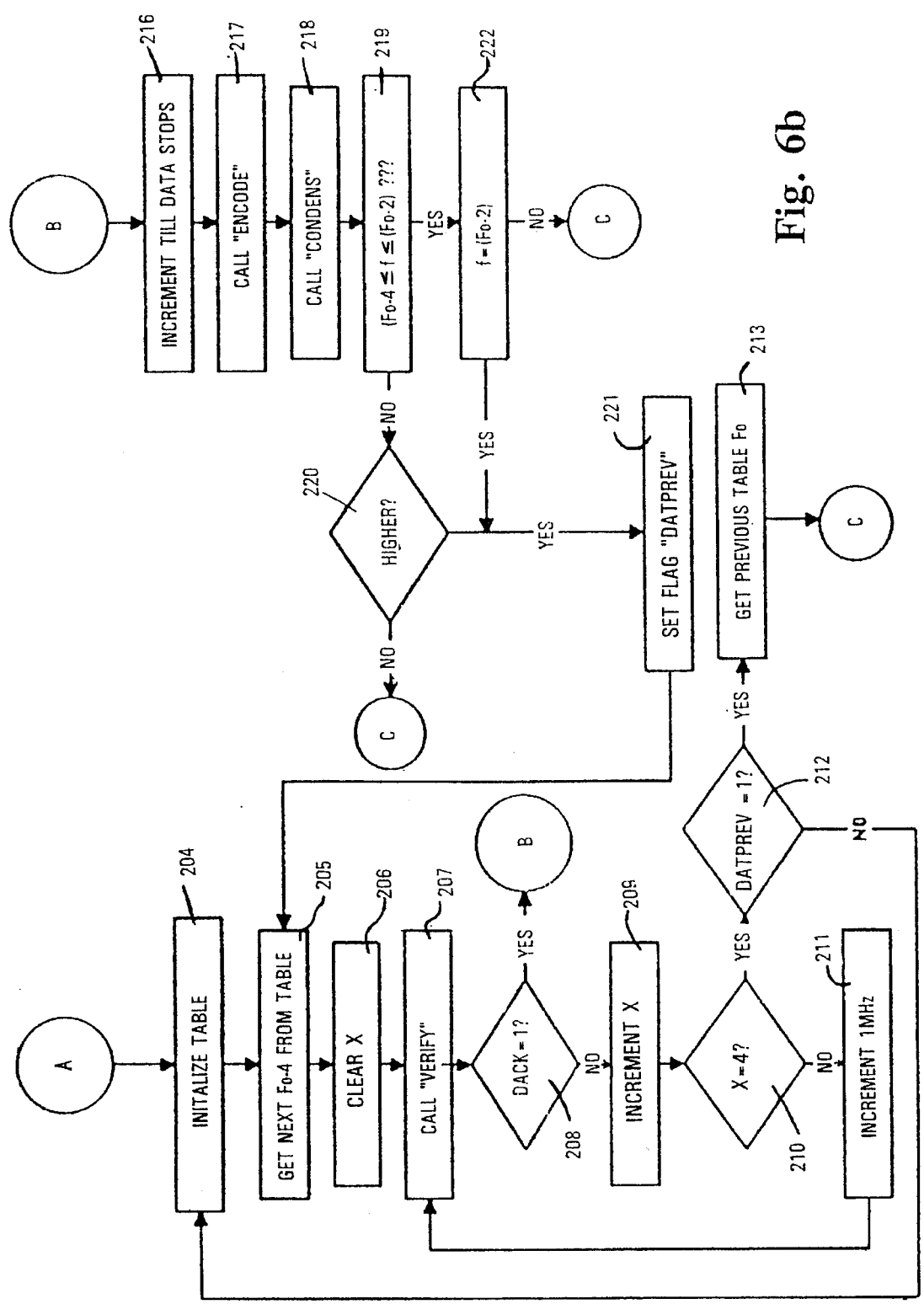
Figure 6C:
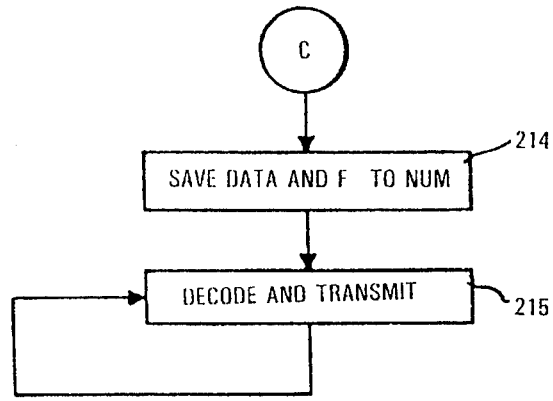

The program begins when switch 46 (FIGS. 1, 3 and 4) of the trainable transmitter is pushed such that the battery positive conductor 97 (FIG. 4) is connected to power supply 56 as indicated by block 150 in FIG. 6a. Power supply 56 generates a 12 volt DC supply potential provided to RF circuit 58 and a 5 volt DC power supply provided to micro-controller 57 and RF circuit 58. The 5 volt DC supply potential provided to micro-controller 57 powers up the micro-controller. Upon power up, the micro-controller initializes its ports and clears its internal random access memory (RAM) in a conventional manner, as indicated by block 200. After the micro-controller initializes the ports and the RAM, a 15 second timer is started as indicated in block 201. The actual amount of the time in this timer may be as short as 5 seconds or as long as 20 seconds. The micro-controller program then reads inputs 102 to determine the position of channel selector switch 47 (FIGS. 2–4) to determine whether channel 1, 2 or 3 is selected by the user, as indicated in block 202. The micro-controller program determines whether the channel selected by the user is already trained, as indicated in decision block 203. If the selected channel is not trained, the micro-controller program initializes a pointer associated with a frequency table, as indicated in block 204 of FIG. 6b.

The frequency table includes frequency control words for all the frequencies at which data is expected. Remote control transmitters which are utilized to control garage door openers have certain frequencies at which they operate. The table contains frequency control signals which control divide-by-N counter 62 to output a signal which controls the RF circuit to selectively generate output signals at these known frequencies. The table is dynamic, such that additional memory locations are provided in the non-volatile memory which may be accessed to store a new frequency control signal without remasking the non-volatile memory. For example, the micro-controller non-volatile memory can be an electronically erasable programmable read only memory (EEPROM) and the transceiver housing can include a port (not shown) through which the EEPROM is externally accessed for programming the non-volatile memory to include a new frequency. Alternately, a functional tester (not shown) utilized in the manufacturing process, which examines the non-volatile memory, may be used to store additional frequency control signals in the non-volatile memory. Accordingly, frequency control words may be added to accommodate different frequencies which garage door opener mechanism manufacturers add at a later time.

The frequency control word identified by the table pointer controls RF circuit 55 to generate an output signal at a frequency F to detect a possible frequency $F_0$ of signal B from remote control 40. The frequency $F_0$ is detected when VCO 65 outputs a signal F which is 3 MHz below $F_0$. The micro-controller program initially selects a frequency control word which controls the VCO 65 to output a signal which is 4 MHz less than frequency $F_0$, as indicated in block 205. The micro-controller program clears an X register, which is an eight bit register internal to the micro-controller, as indicated in block 206. The X register is utilized as a counter. The micro-controller program next calls a "VERIFY" subroutine as indicated in block 207, which determines whether data is being received by the micro-controller and is described below in greater detail in connection with FIG. 7. If data is being received, an internal data acknowledge flag (DACK) is set, and the micro-controller program determines whether the data is being received by examining the DACK flag, as indicated in decision block 208. If data is not being received, the X register is incremented, as indicated in block 209. If the count in register X is less than 4, as determined by the micro-controller in decision block 210, the frequency output by VCO 65 is increased by 1 MHz. The program then repeats steps 207–211 until data is received, as indicated by the DACK flag, or the count in register X reaches 4. If the count in register X reaches 4 before data is received, the micro-controller program determines whether data was previously detected by checking a DATPREV flag, as indicated in block 212.

If it is determined that data is received, such that the DACK flag is set, the micro-controller program determines whether the frequency $F_0$ selected by the frequency control word is the best frequency for emulating the signal from remote control 40. Data should be detected at input 113 of micro-controller 57 when frequency F output by VCO 65 is 3 MHz less than the frequency $F_0$ from remote control 40. The roll-off characteristic of filter 81 is such that data will sometimes be detected when the frequency output by VCO 65 is within the range which is 4 MHz to 2 MHz below the signal from remote control 40. Accordingly, the micro-controller program must be able to distinguish between frequencies one MHz apart.

To distinguish between frequencies which are one MHz apart, the micro-controller program determines frequencies at which data is detected. To accomplish this, the frequency output by VCO 65 is increased in one MHz increments until data is no longer detected by the micro-controller as indicated in block 216 (FIG. 6b). When the frequency F is incremented such the data is no longer detected, the desired frequency is one MHz less than the highest frequency at which the data was detected.

The micro-controller next calls the "ENCODE" subroutine as indicated in block 217. The ENCODE subroutine is described in greater detail hereinbelow. The micro-controller program digitizes the data input to the micro-controller in the ENCODE subroutine. Following the ENCODE subroutine, the "CONDENSE" subroutine is called as indicated in block 218. Because a sequence of data stored in the ENCODE subroutine typically includes more than one data word which is sequentially repeated. The CONDENSE subroutine locates the start and stop points of the repeated word so that the data word is only stored once as described hereinbelow.

After the data is encoded and condensed, the micro-controller program determines the best carrier frequency $F_0$ to emulate signal B. For example, if data is detected when the frequency F of the output signal of VCO 65 is 298 MHz, 299 MHz, and 300 MHz, and data is no longer detected when the frequency F is 301 MHz, the best frequency F to look for data is 299 MHz, and the frequency $F_0$ of the remote control signal B is 302 MHz. In block 219, the micro-controller program determines whether the frequency F output by VCO 65 is greater than or equal to $F_0-4$ MHz or less than or equal to $F_0-2$ MHz. If the carrier frequency F is greater than or equal to $F_0-4$ MHz and less than or equal to $F_0-2$ MHz, the micro-controller program determines whether frequency F is equal to $F_0-2$ MHz as indicated in block 222. If the frequency does not equal $F_0-2$ MHz as determined in block 222, the data detected in the ENCODE subroutine and carrier frequency $F_0$ are stored in the micro-controller non-volatile memory. The micro-controller program then decodes and transmits the stored data signals at frequency $F_0$ as indicated in block 215 (FIG. 6c).

If it is determined that the frequency F of the output signal of VCO 65 is not greater than or equal to $F_0-4$ MHz and less than or equal to $F_0-2$ MHz in decision block 219 (FIG. 6b), the micro-controller program determines whether the frequency is higher than $F_0-2$ MHz as indicated in decision block 220. If the frequency is less than $F_0-4$ MHz, the micro-controller stores the frequency $F_0$ as indicated in block 214 (FIG. 6c) and transmits the frequency and data stored, as indicated in block 215. If it is determined in decision block 220 that the frequency is higher than $F_0-2$ MHz, or if it is determined in block 222 that the frequency equals $F_0-2$ MHz, the micro-controller sets the DATPREV flag to a logic 1, and returns to block 205 to analyze the next frequency in the frequency table. The micro-controller program repeats steps 205–210 until the DACK flag is set or the count in register X equals 4. If the count equals 4, and no data is detected at the current frequency $F_0$, the micro-controller determines whether the DATPREV flag is set in block 212. If the DATPREV flag is set, as determined in block 212, the micro-controller program retrieves the previous table frequency $F_0$ from memory as indicated in block 213. The micro-controller will save the data and the previous frequency $F_0$ in the non-volatile memory as indicated in block 213. The micro-controller will then decode and transmit the stored code and frequency as indicated in block 215.

Figure 7:
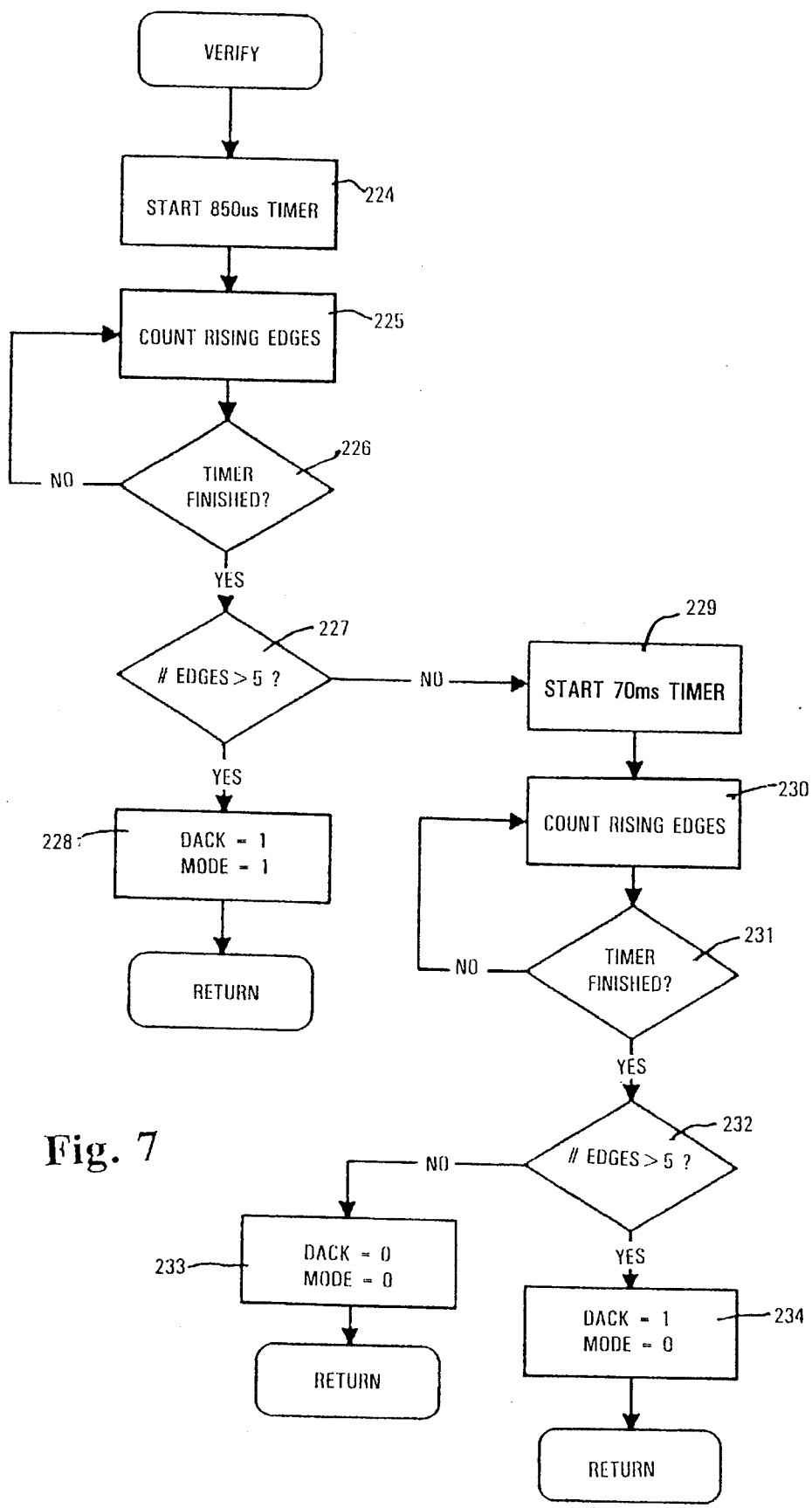
FIG. 7 is a flow diagram for one of the program subroutine shown in FIGS. 6a–6c.

In the VERIFY subroutine shown in FIG. 7, the micro-controller program determines whether data is being received as indicated briefly above. The micro-controller program first initiates and starts an 850 microsecond timer, as indicated in block 224, and counts rising edges, as indicated in block 225. The micro-controller program continues to count rising edges until the 850 microsecond timer times out, as indicated in decision block 226. When the timer times out, the micro-controller program determines whether the number of edges is greater than five, as indicated in block 227. If more than five edges are detected in the 850 microsecond interval, the DACK flag is set to 1 and the mode is set to 1 as indicated in block 228. In mode 1, the micro-controller has identified amplitude modulated frequency shift key data, such as used by garage door opening systems marketed under the Genie trademark. If five edges were not detected in the 850 microsecond time interval, as determined in decision block 227, a 70 ms timer is started as indicated by block 229. Rising edges are detected and counted during the 70 ms period. When the timer times out, the micro-controller counts the number of edges detected during the 70 ms period. If more than five edges are detected as determined in block 232, the DACK flag is set and the mode is set to 0 as indicated in block 234. Mode 0 indicates that the data format is a binary code associated with a carrier signal. If fewer than five edges are detected in the 70 ms time interval, the DACK flag is set to 0, as indicated in block 233, indicating that data was not acknowledged, and the micro-controller returns to the main program.

Figure 8:
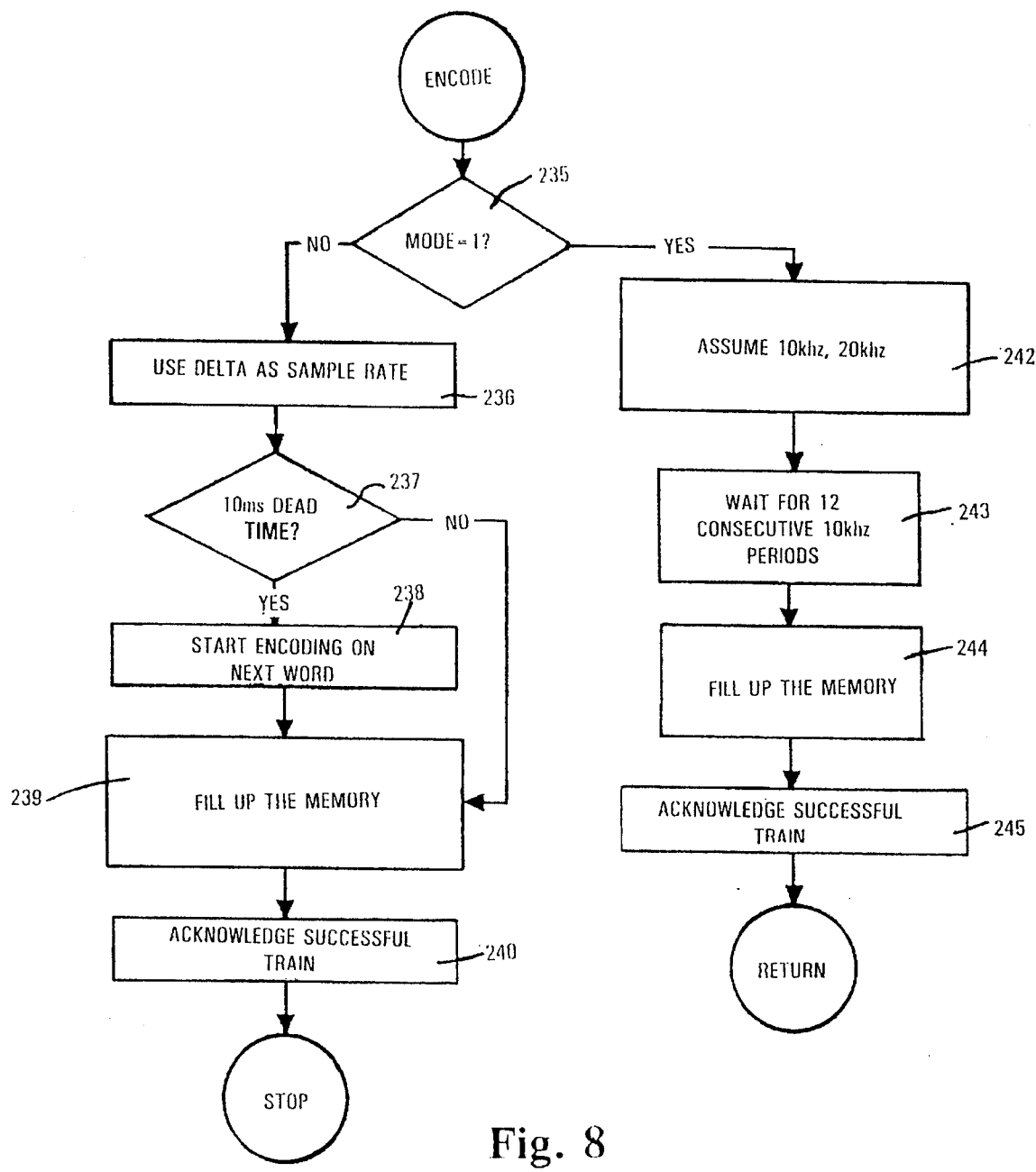
FIG. 8 is a flow diagram for one of the program subroutines shown in FIGS. 6a–6c.

In the ENCODE subroutine shown in FIG. 8, the micro-controller first determines whether the code is a 0 or a 1mode, as indicated in decision block 235. If the mode is 0, the micro-controller program samples the input 113 every 68 microseconds as indicated in block 236. The micro-controller program then determines whether a 10 ms dead time has elapsed in decision block 237. If the 10 ms time interval has elapsed, the micro-controller starts encoding on the next detected leading edge. Each 68 microseconds, the micro-controller samples the input. The samples are stored until the memory allocated to the samples is full. If it is determined in block 237 that a 10 ms dead time was not present in the samples, the data is sampled and stored in memory as it is received at input 113. The data samples are stored until the memory is filled as indicated in block 239. After the memory is filled, the micro-controller program acknowledges a successful train by flashing LED 48.

If the micro-controller determines that the code is mode 1 in decision block 235, the micro-controller assumes that the frequency of the signals being received alternate between 10 KHz and 20 KHz frequencies as indicated in block 242. The micro-controller waits for 12 consecutive 10 KHz samples before storing the received code in memory as indicated in block 243. The received code is stored in memory until the allocated memory is filled, as indicated in block 244. The micro-controller then acknowledges the successful train by flashing LED 48 before storing the received code in memory, as indicated in block 243. The received code is stored in memory until the allocated memory for storage of the code is filled, as indicated in block 244.

Figure 9:
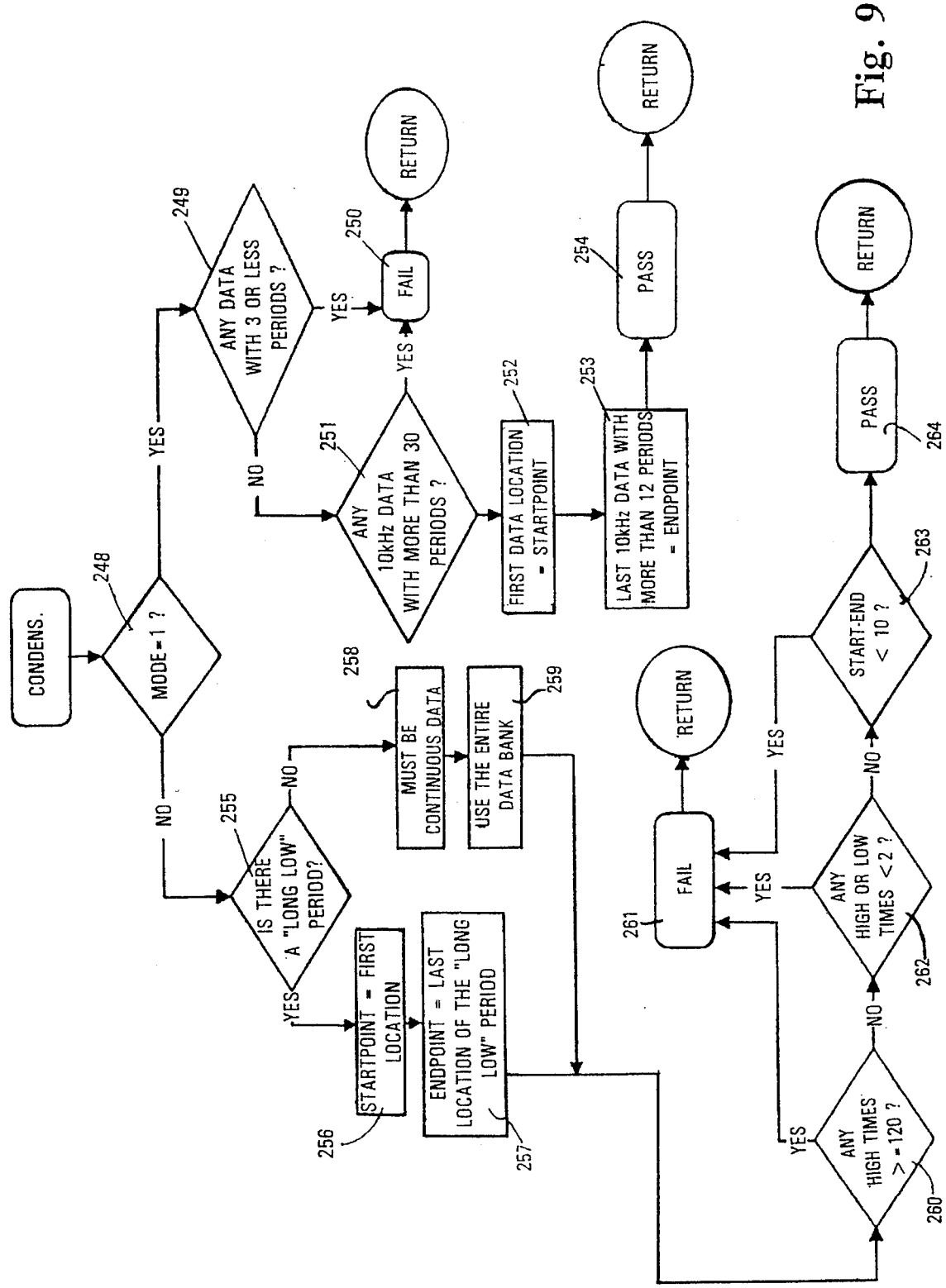
FIG. 9 is a flow diagram for another program subroutine shown in FIGS. 6a–6c.

In the CONDENSE subroutine shown in FIG. 9, the micro-controller program first determines whether the code is mode 1 or mode 0 code, as indicated in block 248. If the code is mode 1, the micro-controller program determines whether the 10 KHz or 20 KHz signals stored in memory during the ENCODE subroutine have three or fewer periods, as indicated by decision block 249. If one of the frequencies stored in the memory has three or fewer periods, the micro-controller program acknowledges a failure of the training by flashing LED 48 at a rate different from that of the successful train acknowledgment, and the micro-controller returns to the main program.

If the data does not contain three or fewer periods, the micro-controller determines whether the 10 KHz signal has more than thirty periods, as indicated in block 251. If the micro-controller determines that the 10 KHz data has more than thirty periods, the micro-controller program acknowledges a failure as indicated in block 250, and the program returns to the main program. If it is determined that the data does not have more than thirty 10 KHz periods, the data is presumed to be valid. The first data location in the memory is the starting point for the code stored therein. The memory locations are filled until twelve consecutive 10 KHz periods are detected. Thus, the first memory storage location is the beginning of the data word, and the last 10 KHz sequence of twelve consecutive periods is the end point of the word. The micro-controller recognizes a valid train after the sequence of twelve 10 KHz data periods as indicated in block 254.

If it is determined in block 248 that the program is in mode 0, the micro-controller program determines whether there is a long period without a high logic level stored in memory. If there is a long period without a high logic level signal, the starting point of the data word is the first location in the memory, as indicated in block 256. The end point of the data word is the last location in the memory associated with the long low period. The stored data word is thus repeated in the signal "T" transmitted to activate the garage door opening mechanism. If the micro-controller determines that there is no long period without high logic levels in decision block 255, the micro-controller program determines that the data stored in the memory is continuous data as indicated in block 258, and all the data stored in the memory in the ENCODE subroutine is transmitted as indicated in block 259. The micro-controller program determines whether 120 consecutive samples are high logic levels as indicated in block 260. If 120 consecutive samples are high logic level signals, the micro-controller determines that the data stored is contaminated and a failure is signaled using LED 48 as indicated in block 261.

If the micro-controller program passes the test of decision block 260, the micro-controller program determines whether at any location in the data word less than three consecutive samples are at a high or a low logic level, as indicated in decision block 262. This indicates that a noise spike has contaminated the data. If less than three consecutive samples are at single logic level, a failure is detected and the micro-controller program signals a failure using LED 48 as indicated in block 261. If the data passes the test of decision block 262, the micro-controller determines whether the entire data word is stored in less than ten memory locations, as indicated in decision block 263. If the entire word is stored in fewer than ten memory stack locations, the micro-controller identifies a failure as indicated in block 261. If the data passes the test of decision blocks 260, 262 and 263, the micro-controller program identifies a valid training session and returns to the main program.

If the GDO activate/train switch 46 is pushed, the fifteen-second timer is initialized in block 201 (FIG. 6a), the channel selector is read and the channel identified by the channel selector is trained, as determined in decision block 203, the micro-controller program downloads frequency $F_0$ and the data word stored in the non-volatile memory associated with the selected channel. The frequency of the divide-by-N counter is set by the signal at outputs 109 of micro-controller 108. Additionally, the attenuation select output 112 is utilized to set the variable attenuator 71 inversely to the duty cycle of the data being transmitted. Thus, if the duty cycle of the control pulses input to switch 70 are long, the amplitude of the signals output through antenna 73 will be proportionally less than the amplitude of signals output from antenna 73 when the pulses have a short duty cycle.

As indicated above, the transceiver includes two training modes for learning two different signal types. In mode 0, an oscillating carrier signal is transmitted when switch 70 is open. The carrier signal is not transmitted when switch 70 is closed. In mode 1, a signal alternating between 10 KHz and 20 KHz signals is continuously transmitting. In mode 1, the number of periods transmitted at each frequency represents the code of the transmitted signal. Because the carrier signal is continuously transmitted in mode 1, the variable attenuator is set to maximum attenuation in mode 1.

Thus, it can be seen that a trainable garage door transmitter is provided which is adapted for use in any remote control garage door opener and includes the flexibility to learn different garage door opener remote control formats. Additionally, the trainable garage door transmitter allows the micro-controller to vary the amplitude of transmitted pulses proportionately to the duty cycle of the transmitted pulses. The trainable transmitter also includes a training technique wherein an input frequency is adjusted until the internal frequency matches an external frequency received by a garage door opener remote control during training. Additionally, the trainable garage door opener has the capability of increasing the number of frequencies identified by control words stored therein. This allows the number of frequency control words to be minimized, reducing the number of frequencies which must be tested to thereby reduce the training time and memory storage requirements of the table, while allowing the number of frequencies to be accommodated. Thus, a flexible and efficient system provides a trainable transmitter in a vehicle which can be integrated into the vehicle as original equipment and replace portable existing transmitters.

It will become apparent to those skilled in the art that various modifications to the preferred embodiment described and disclosed herein can be made. Such modifications will, however, fall within the spirit or scope of the invention as defined in the appended claims.

The embodiments of the invention in which an exclusive property or privilege is claimed are defined as follows:

1. A vehicle accessory including a trainable transmitter for transmitting a radio frequency control signal for remotely actuating a remotely controlled device, comprising:

a housing;

a connector connecting said housing to the interior of a vehicle in an area accessible to the vehicle operator;

a transceiver mounted in said housing for receiving signals from an existing remote control transmitter for the device, said transceiver including:

a detector inputting the signals received from the existing remote control transmitter, a memory for storing frequency and code format information, a variable frequency generator having a frequency control input and an output, said variable frequency generator generating a signal at said output having a frequency selected by a frequency control signal at said frequency control input, a switch having a switch control input and an output, said output coupled to said variable frequency generator, a controller for generating said frequency control signal and a switch control signal, said controller coupled to said memory, said controller including an input coupled to said detector, said controller including an output coupled to an input of said variable frequency generator, said controller having a switch control output coupled to said switch control input of said switch, said switch control signal including a data sequence which selectively disables said variable frequency generator; and an output circuit connected to said output of said variable frequency generator; wherein said output circuit responds to signals from said variable frequency generator to selectively transmit signals output from said variable frequency generator for remotely actuating a garage door opening mechanism at a carrier frequency stored in said memory and modulating data according to a code format stored in said memory, wherein said controller learns frequency and data information for at least two signalling formats of remote control signals from remote control transmitters for controlling operation of at least two different types of remote control garage door opening mechanism receivers, said controller identifying a first signalling format when a predetermined number of data transitions are detected in a first preset time interval, said controller identifying a second signalling format when a second predetermined number of data transitions are detected in a second preset time interval.

2. The vehicle accessory as defined in claim 1, wherein said output circuit includes an amplitude control circuit for controlling the amplitude of said signal transmitted by said output circuit.

3. The vehicle accessory as defined in claim 2, wherein said amplitude control circuit includes a variable impedance.

4. The vehicle accessory as defined in claim 3, wherein said controller varies said frequency control signal in a training mode of operation to vary the output of said variable frequency generator until data is detected at said input of said controller.

5. A trainable transceiver for remotely actuating a device having an RF receiver, comprising:

a detector inputting an RF signal from an existing remote control transmitter for the device the RF signal having a carrier frequency and a data format;

a signal generator having a frequency control input and an output, said signal generator generating a signal at said output having a frequency controlled by a frequency control signal applied to said frequency control input;

an output circuit coupled to said output of said generator, said output circuit including a data controller having a data input for receiving a data control signal and selectively outputting signals according to the data control signal for remotely actuating a device, said output circuit including an amplitude control circuit having a control input for controlling the magnitude of said signal output by said output circuit; and a control circuit having an input coupled to said detector and including output terminals coupled to said frequency control input, said data input, and to an input of said amplitude control circuit, said control circuit controlling said amplitude such that the magnitude of said signal output by said output circuit is inversely related to duty cycle of said data control signal.

6. A frequency and code trainable radio frequency transceiver for receiving training signals from an existing radio frequency remote control and for learning the frequency and code of information transmitted by the existing radio frequency remote control for subsequent transmission for actuating a remotely controlled device, said transceiver comprising:

receiving means for receiving coded radio frequency signals from an existing remote control transmitter for a device;

circuit means including a microcontroller having input means coupled to said receiving means for detecting the radio frequency and coding of received coded radio frequency signals transmitted by the existing remote control transmitter, said circuit means having output means, said circuit means responsive to detected radio frequency signals for providing a modulating output signal representative of the radio frequency and code of said coded radio frequency signals to said output means; and an output circuit having input means coupled to said output means of said circuit means for receiving said modulating output signal, said output circuit responsive to said modulating output signal for transmitting a control signal which duplicates the frequency and code of signals transmitted by the existing remote control transmitter, said output circuit further includes a variable attenuator coupled to said input means for selectively attenuating said control signal.

7. A trainable transceiver for learning and transmitting an activation signal that includes an RF carrier frequency modulated with a code for remotely actuating a device, said trainable transmitter comprising:

a controller operable in a learning and an operating mode, said controller receiving an activation signal in said learning mode and responsive thereto for storing data corresponding to the radio frequency and code of the activation signal, said controller in said operating mode providing output data which identifies the radio frequency and code of the received activation signal and an amplitude control signal;

a signal generator coupled to said controller, for receiving said output data for outputting a modulated radio frequency carrier signal representing the received activation signal; and an amplitude controller coupled to said signal generator and to said controller, for receiving said amplitude control signal from said controller for selectively controlling the amplitude of the modulated radio frequency carrier signal received from said signal generator at an amplitude level indicated by the amplitude control signal, and for transmitting an amplitude-controlled output signal to the device.

8. The transceiver as defined in claim 7, wherein said controller determines the amplitude level based upon signal characteristics of the received activation signal.

9. The transceiver as defined in claim 8, wherein said controller determines the amplitude level based upon the detected radio frequency carrier of the received activation signal.

10. The transceiver as defined in claim 8, wherein said controller determines the amplitude level based upon a detected pulse duration of control data provided in the received activation signal.

11. The transceiver as defined in claim 8, wherein said controller determines the amplitude level based upon both the detected radio frequency carrier of the received activation signal and a detected pulse duration of a control signal provided in the received activation signal.

12. The transceiver as defined in claim 7, wherein said amplitude controller comprises means for setting the amplitude level at one of four possible levels in response to the amplitude control data received from said controller.

13. A method using a trainable transceiver for learning and transmitting an activation signal that remotely actuates a device, the method comprising the steps of:

receiving an activation signal in a learning mode;

generating radio frequency control data, which indicates a detected radio frequency carrier of the received activation signal, and amplitude control data, which indicates an amplitude level;

generating an output signal having a radio frequency carrier corresponding to that of the received activation signal;

selectively controlling the amplitude of the output signal at the amplitude level indicated by the amplitude control data; and transmitting the amplitude-controlled output signal to the device.

14. The method as defined in claim 13, further comprising the step of:

determining the amplitude level based upon characteristics of the received activation signal.

15. The method as defined in claim 13, further comprising the step of:

determining the amplitude level based upon the detected radio frequency carrier of the received activation signal.

16. The method as defined in claim 13, further comprising the step of:

determining the amplitude level based upon a detected pulse duration of control data provided in the received activation signal.

17. The method as defined in claim 13, further comprising the step of:

determining the amplitude level based upon both the detected radio frequency carrier of the received activation signal and a detected pulse duration of a control signal provided in the received activation signal.

18. A frequency and code trainable radio frequency transceiver for receiving training signals from an existing radio frequency remote control and for learning the frequency and code of information transmitted by the existing radio frequency remote control for subsequent transmission for actuating a remotely controlled device, said transceiver comprising:

receiving means for receiving coded radio frequency signals from an existing remote control transmitter for a device;

circuit means having input means coupled to said receiving means for detecting the radio frequency and coding of received coded radio frequency signals transmitted by the existing remote control transmitter, said circuit means having output means, said circuit means responsive to detected radio frequency signals for providing a modulating output signal representative of the radio frequency and code of said coded radio frequency signals to said output means; and an output circuit having input means coupled to said output means of said circuit means for receiving said modulating output signal, said output circuit responsive to said modulating output signal for transmitting a control signal which duplicates the frequency and code of signals transmitted by the existing remote control transmitter, said output circuit further including an amplitude controller coupled to said input means for selectively varying the amplitude of said control signal.

* * * * *

UNITED STATES PATENT AND TRADEMARK OFFICE
CERTIFICATE OF CORRECTION

| | | |
|---|---|---|
| PATENT NO. | : 5,479,155 | Page 1 of 1 |
| APPLICATION NO. | : 08/263263 | |
| DATED | : December 26, 1995 | |
| INVENTOR(S) | : Zeinstra et al. | |

It is certified that error appears in the above-identified patent and that said Letters Patent is hereby corrected as shown below:

On the Title page item "[75] Inventors: Mark L. Zeinstra; Kurt A. Dykema, both of Holland, Mich."

Should read: "[75] Inventors: Mark L. Zeinstra; Kurt A. Dykema, both of Holland, Mich. and Fred Bassali, Great Neck, NY."

Signed and Sealed this
Seventeenth Day of March, 2015

Michelle K. Lee
*Director of the United States Patent and Trademark Office*